United States Patent [19]

Ajioka et al.

[11] Patent Number: 5,447,962
[45] Date of Patent: * Sep. 5, 1995

[54] DEGRADABLE FOAM AND USE OF SAME

[75] Inventors: Masanobu Ajioka; Katashi Enomoto; Akihiro Yamaguchi; Kazuhiko Suzuki; Takayuki Watanabe; Yasuhiro Kitahara, all of Kanagawa, Japan

[73] Assignee: Mitsui Toatsu Chemicals, Inc., Tokyo, Japan

[*] Notice: The portion of the term of this patent subsequent to Aug. 24, 2010 has been disclaimed.

[21] Appl. No.: 186,920

[22] Filed: Jan. 27, 1994

Related U.S. Application Data

[60] Division of Ser. No. 63,043, May 19, 1993, abandoned, which is a continuation of Ser. No. 857,266, Mar. 25, 1992.

[30] Foreign Application Priority Data

| Apr. 1, 1991 | [JP] | Japan | 3-068232 |
| Nov. 15, 1991 | [JP] | Japan | 3-300586 |
| Nov. 15, 1991 | [JP] | Japan | 3-300587 |

[51] Int. Cl.$^6$ .............................................. C08J 9/10
[52] U.S. Cl. ........................................ 521/79; 521/95; 521/97; 521/182; 521/916
[58] Field of Search ............... 521/182, 79, 95, 97, 521/916

[56] References Cited

U.S. PATENT DOCUMENTS

| 4,181,983 | 1/1980 | Kulkarni . |
| 4,702,917 | 10/1987 | Schindler . |
| 4,719,246 | 1/1988 | Murdoch et al. . |
| 4,766,182 | 8/1988 | Murdoch et al. . |
| 5,134,171 | 7/1992 | Hammel et al. . |
| 5,210,108 | 5/1993 | Spinu et al. ................ 521/182 |
| 5,223,546 | 6/1993 | Morita et al. . |
| 5,238,968 | 8/1993 | Morita et al. ................ 521/182 |

FOREIGN PATENT DOCUMENTS

| 251631 | 1/1988 | European Pat. Off. . |
| 92/01737 | 2/1992 | WIPO . |

*Primary Examiner*—Morton Foelak
*Attorney, Agent, or Firm*—Burns, Doane, Swecker & Mathis

[57] ABSTRACT

Foams comprising innumerable cells dispersed in thermoplastic polymer compositions substantially consisting of polylactic acid or a copolymer of lactic acid and hydroxycarboxylic acid and having degradable characteristics in the natural environment.

The foams can be used for containers such as food trays and throw away cups comprising molded sheet foam of a thermoplastic and degradable polymer or heat insulating materials and cushioning materials comprising bulk foam.

4 Claims, No Drawings

DEGRADABLE FOAM AND USE OF SAME

This application is a divisional of application Ser. No. 08/063,043, filed Jun. 19, 1993, which is a continuation of application Ser. No. 07/857,266, filed on Mar. 25, 1992.

BACKGROUND OF THE INVENTION

1. Field of the Invention

The present invention relates to a degradable foam. More particularly, the invention relates to a foam which is composed of a thermoplastic polymer Composition substantially comprising polylactic acid or a copolymer of lactic acid and hydroxycarboxylic acid and has degradable characteristics in the natural environment.

The foam of these thermoplastic and degradable polymers can be used for food containers and throwaway cups after processing into sheets or used for heat insulating materials or cushioning materials in the form of bulk.

2. Related Art of the Invention

Foams of polyolefin, polyurethane and polyamide based resin have been conventionally used in a broad field of containers, cushioning materials and heat insulating materials. These foams, in particular, can be processed into formed articles with a small amount of resin and hence are used for food containers, disposable cups and lunch boxes which are cheap and light and also for interior dividers and wrapping materials of readily damageable matters such as vegetables, fruits and perishable foods.

However, the foams prepared from these resins or articles such as containers, cushioning materials and heat insulating materials which are prepared from these foams are of great bulk on discarding and form an increasing amount of garbage. Additionally, conventional products have very slow degradation speed in the natural environment and remain semipermanently when disposed under the ground. Further, throw away plastics have caused problems such as damage of a view and destruction of the living environment of marine organisms.

However, the foams capable of readily degrading in the natural environment and articles such as containers, cushioning materials and heat insulating materials obtained by using these foams have not yet been known.

On the other hand, a lactic acid-based polymer, that is, a polymer substantially consisting of lactic acid or a copolymer of lactic acid has been known as a thermoplastic and degradable polymer.

The lactic acid-based polymer has degradable characteristics in the natural environment. When the polymer is allowed to stand in soil or sea water, the polymer starts degradation within several weeks and disappears in about a year. Final degradation products are lactic acid, carbon dioxide and water. All of these products are nonhazardous.

The raw material lactic acid can be obtained by fermentation of inexpensive materials such as corn starch and corn syrup and can also be prepared from petrochemicals such as ethylene.

U.S. Pat. No. 1,995,970 discloses a preparation process by polymerization of lactic acid, lactide or a mixture of these compounds. Polymers of lactic acid are usually prepared from a cyclic dimers of lactic acid, called lactide. The polymers can also be directly prepared from lactic acid through dehydrating condensation. The straight chain polyester prepared from lactide by ring-opening polymerization has a high molecular weight. On the other hand, the polymer directly obtained from lactic acid by dehydrating condensation is liable to difficultly increase molecular weight even through reaction time is extended.

The lactic acid-based polymer has been used for surgical sutures and medical slow release matrixes because of good biological compatibility and degrading ability. However, foams of the polymer which are used for containers, heat insulating materials and cushioning materials have not yet been known.

SUMMARY OF THE INVENTION

The object of the invention is to provide a foam of a thermoplastic and degradable polymer which can degrade with ease in the natural environment and does not impair the natural environment, and to provide a container and cushioning material obtained by using the foam.

The above object has been accomplished by finding out that a lactic acid-based polymer can be foamed without impairing the degradable characteristics of the polymer and additionally that the resulting foam has excellent physical properties such as heat insulation and mechanical strengths.

One aspect of the present invention is therefore a degradable foam comprising a thermoplastic polymer composition substantially consisting of polylactic acid or a copolymer of lactic acid and hydroxycarboxylic acid and is a container and a cushioning material obtained by using the foam.

DETAILED DESCRIPTION OF THE INVENTION

Polylactic acid or a copolymer of lactic acid and hydroxycarboxylic acid for use in the invention is prepared by using lactic acid or lactide, namely a cyclic dimers of lactic acid, and hydroxycarboxylic acid as raw materials.

Exemplary hydroxycarboxylic acids include glycolic acid, hydroxybutyric acid, hydroxyvaleric acid, hydroxypentanoic acid, hydroxycaproic acid and hydroxyheptanoic acid. Specially, glycolic acid, 3-hydroxylactic acid, 4-hydroxylactic acid, 3-hydroxyvaleric acid or 6-hydroxy caproic acid is used preferably. In certain cases, other monomers can be suitably used as a mixture.

The lactic acid polymer used for the invention may be prepared directly from lactic acid by dehydrating polycondensation or may be prepared by ring-opening polymerization of lactide.

When a low molecular weight polymer is permitted, the polymer is obtained by dehydrating condensation of lactic acid. When a high molecular weight polymer is required, the polymer is preferably obtained by ring-opening polymerization of lactide.

Lactides which can be used for the ring-opening polymerization are L-lactide, D-lactide, meso-lactide and a mixture of these lactides. A mixture of D- or L-lactide with a lactide having opposite optical activity is preferred. Preferred mixing ratios are is D- or L-lactide/optical antipode $= 95/5 \sim 50/50$.

The polymerization degree of lactic acid-base polymer is in the range of from about 150 to about 20,000. A Polymerization degree lower than the range leads to low mechanical strengths of processed articles such as films and is unsuitable for practical use.

A Polymerization degree higher than the range results in high melt viscosity and inferior processing ability. Polymerization can be carried out in the presence or absence of a solvent. In view of solvent recovery problem, bulk polymerization without solvent is preferred in industry.

A process for preparing lactic acid-based polymer by ring-opening polymerization of lactide and glycolide will be exemplified hereinafter.

The ring-opening polymerization is carried out in the presence of a catalyst. Catalysts which can be used are generally chloride or carboxylate of zinc or tin and include, for example, stannous octoate, tin tetrachloride, zinc chloride, titanium tetrachloride, iron chloride, boron trifluoride ether complex, aluminium chloride, antimony trifluoride, lead oxide and other polyvalent metal containing compounds. No particular restriction is imposed upon the polyvalent metals. Tin compounds and zinc compounds are preferably used. However, in the case of using the foam for biocompatible materials and food products, these metals must be selected in view of toxicity.

The amount of the catalyst used is preferably in the range of from 0.001 to 0.1% by weight for lactide or for the total weight of lactide and glycolide.

Known chain extenders can be used for the polymerization. Preferred chain extenders are higher alcohols such as lauryl alcohol and hydroxy acids such as lactic acid and glycolic acid. The polymerization rate increases in the presence of a chain extender and the polymer can be obtained within a short time. The molecular weight of the polymer can also be controlled by varying the amount of the chain extender. However, too much of the chain extender tends to decrease the molecular weight of polymer formed. Hence, the amount of the chain extender is preferably 0.1% by weight or less for lactide or for the total weight of lactide and glycolide.

Polymerization or copolymerization can be carried out in the presence or absence of a solvent. Bulk polymerization in a molten state of lactide or glycolide is preferably carried out in order to obtain high molecular weight polymer.

In the case of molten polymerization, the polymerization temperature may be generally above the melting point (around 90° C.) of the monomer, lactide or lactide and glycolide. In the case of solution polymerization which uses solvents such as chloroform, polymerization can be carried out at temperatures below the melting point of lactide or lactide and glycolide. In any case, polymerization temperatures above 250° C. are unfavorable because decomposition of the formed polymer develops.

The foam of the invention is formed in such structure that a great many cells are dispersed throughout the polymer.

Foaming of the polymer can be carried out with an optional method. A method using a foaming agent is usually preferred because the method can be carried out cheaply with ease. Foaming is preferably carried out in the processing step. A preferred processing method is the so-called extrusion foaming where foam expansion takes place simultaneously with delivery from an extruder.

Foaming agents which can be used are decomposition type foaming agents which generate gas by decomposition on heating, and include, for example, inorganic foaming agents such as sodium hydrogen carbonate and organic foaming agents such as azodicarbonamide, N,N'-dinitrosopentamethylenetetramine, P,P'-oxybis(-benzenesulfonylcarbazide), azobisisobutyronitrile and benzenesulfonylhydrazide.

Similarly, evaporation type foaming agents which generate cells by vaporization of liquid can also be used, and include, for example, ethane, propane, butane, pentane, hexane, heptane, ethylene, propylene, petroleum ether and other hydrocarbons; and methyl chloride, monochlorotrifluoromethane, dichlorodifluoromethane, dichlorotetrafluoroethane and other halogenated hydrocarbons.

The amount of the foaming agent is preferably from about 0.1 to about 30% by weight, more preferably from about 0.5 to about 10% by weight for the polymer composition. Auxiliary foaming agents, cell stabilizers and nucleating agents can also be added in a suitable amount, if desired, and include, for example, organic acids such as stearic acid, oxalic acid, salicylic acid, phthalic acid, benzoic acid, citric acid and tartaric acid; inorganic acids such as boric acid; salts of these organic and inorganic acids; carbonates such as sodium carbonate; zinc oxide, calcium oxide, titanium oxide, silica, alumina, clay, kaolin and diatomaceous earth.

In preparing the foam, plasticizers can also be added to the polylactic acid-based polymer composition in order to provide flexibility for the foam.

Plasticizers which can be safely used for wrapping and containers of foods are preferably added in preparation of the foam and include, for example, diethyl phthalate, dioctyl phthalate, dicyclohexyl phthalate and other phthalic acid esters; di-i-butyl adipate, di-n-octyl adipate, di-n-butyl sebacate, di-2-ethylhexyl azelate and other aliphatic dicarboxylic acid esters; diphenyl 2-ethylhexyl phosphate, diphenyl octyl phosphate and other phosphoric acid esters; tributyl acetylcitrate, tri-2-ethylhexyl acetylcitrate, tributyl citrate and other hydroxypolycarboxylic acid esters; methyl acetylricinoleate, amyl stearate and other aliphatic esters; glycerol triacetate, triethylene glycol dicaprylate and other polyhydric alcohol esters; epoxylated soybean oil, octyl epoxystearate and other epoxy-base plasticizers; and polypropylene glycol adipate, polypropylene glycol sebacate and other polyester base plasticizers.

The amount of the plasticizer added is usually from about 5 to about 50% by weight, preferably from about 5 to about 20% by weight of the polymer composition. The plasticizer is added as a solution in a solvent to the lactic acid-base polymer or may be added in molten state.

Pigments, flame retardants and fillers can be added in a suitable amount in order to color or modify foamed articles.

The foaming temperature differs depending upon the polymer composition. Foaming is usually carried out at temperature where melt viscosity is maintained in the range of from about 30,000 to about 80,000 poise, when the temperature is lower than this range, molten polymer has high viscosity, formation of cells is slow, and thus foaming rate is low. On the other hand, when the temperature is higher than this range, viscosity of the polymer becomes too low, retention of cells becomes difficult and thus the resultant foam collapses.

The foaming rate differs depending upon the desired use. A foaming rate of about 1.5 to about 20 times is preferred for food packaging trays and throw away cups which require mechanical strengths. In the case of using for heat insulating materials and cushioning materials which require relatively low mechanical strengths, foaming rate is preferably about 3 to about 50 times, more preferably about 5 to about 25 times.

In order to use the foam of the invention for a container, a foamed sheet obtained by extrusion foaming is heated again, softened and successively hot molded into a desired shape by vacuum or press molding. The foamed container preferably has a partially removed skin layer on the outside surface.

In order to partially remove the skin layer from the outside surface, for example, cut lines are fitted on the surface layer of the sheet foam prior to hot molding and enlarged by heating in an oven before molding the container. Alternatively, the container is perforated after molding.

In cases where the foam of the invention is used for a cushioning material, a sheet foam or a net-shaped foam is used singly or as a lamination with paper. Good cushioning performance can be obtained by the method without impairing degradable characteristics of the foam in the invention.

The sheet foam can be softened by heating again and successively hot molded into a desired form by vacuum or press molding. A preferred sheet foam is partially perforated to install many edge faces in the sheet.

The net-shaped foam can be cut into a prescribed length and used by bringing the foam into contact with an article to be wrapped. Alternatively, the net-shaped foam can be used for a divider or an underlay pad by laminating with paper.

The present invention will hereinafter be illustrated in detail by way of examples. However, these examples are not intended to limit the scope of the present invention.

Examples 1~3

To a mixture of poly D,L-lactide having a molecular weight of 100,000 and poly L-lactide, 0.5% by weight of talc was added as a cell regulator as illustrated in Table 1. The resulting mixture was melt-kneaded with an extruder having an internal diameter of 50 mm. Successively, dichlorodifluoromethane was charged under pressure at a ratio of 0.065 mole per 100 g of the resin, delivered at 140° C. through a slit into the atmosphere to obtain a sheet foam. The thickness and apparent density of the sheet foam obtained are illustrated in Table 1.

A test specimen having dimensions of 10×50 mm was cut out of the sheet foam and a degradation test was conducted in warm water at 60° C. Results are illustrated in Table 1.

TABLE 1

| Example | 1 | 2 | 3 |
|---|---|---|---|
| L-PLA (wt %) | 80 | 50 | 20 |
| DL-PLA (wt %) | 20 | 50 | 80 |
| Sheet thickness (mm) | 1.1 | 2.5 | 2.6 |
| Density (g/cc) | 0.48 | 0.30 | 0.26 |
| Flexural modulus (kgf/cm$^3$) | 200 | 5500 | 4100 |
| Thermal conductivity $\lambda$ (kcal/m.h. °C.) | 0.06 | 0.05 | 0.04 |
| Weight loss in warm water (60 °C., 20 days) (%) | 8 | 11 | 14 |

Examples 4–6

To a copolymer of L-lactide and oxycarboxylic acid, 1.5% by weight of azodicarbonamide was dry blended as illustrated in Table 2. The mixture was melt-kneaded with a 500 mm φ extruder and delivered through a slit at 140° C. into the atmosphere to obtain a sheet foam. The thickness and apparent density of the sheet foam are illustrated in Table 2. The same degradation test as in Example 1 was carried out in warm water and results are illustrated in Table 2.

TABLE 2

| Example | 4 | 5 | 6 |
|---|---|---|---|
| L-Lactide (wt %) | 50 | 50 | 50 |
| Comonomer | D-lactide | glycolide | ε-caprolactone |
| Average molecular weight | 100,000 | 100,000 | 70,000 |
| Sheet thickness (mm) | 2.5 | 2.8 | 2.3 |
| Density (g/cc) | 0.31 | 0.28 | 0.33 |
| Flexural modulus (kgf/cm$^2$) | 5,400 | 4,900 | 6,400 |
| Thermal Conductivity (k cal/m.h. °C.) | 0.05 | 0.05 | 0.05 |
| Weight loss in warm water (60° C., 20 days) (%) | 16 | 18 | 23 |

Examples 7~9

To a mixture of poly D,L-lactide having a molecular weight of about 100,000 and poly L-lactide, 0.5% by weight of talc was added as a cell regulator as illustrated in Table 3. The resulting mixture was melt-kneaded at 200° C. with a 50 mm φ extruder and successively butane was charged under pressure at a rate of 0.065 mole per 100 g of the resin. Thereafter the resin mixture was cooled in the extruder to a cylinder temperature of 140° C. and delivered through a slit into the atmosphere to obtain a sheet foam having a width of 650 mm. The thickness and apparent density of the sheet foam thus-obtained are illustrated in Table 3. The sheet foam was vacuum molded into a tray having dimensions of 200×100×15 mm. Before entering into an oven of the vacuum molding machine, the sheet foam was passed through rolls so as to provide cross cuts of 5 mm in length for the outside surface of the tray. The cutting line was enlarged in width to about 2 mm after passing through the oven at 150° C. The sheet foam was successively placed on a mold and shaped by applying vacuum.

The skin layer was removed in the form of a lattice from outside of the tray thus obtained. The tray had no problem in practical use. A degradation test was carried out by burying the tray at 35° C. into soil having a moisture content of 30%.

Evaluation of degrading characteristics was conducted by measuring weight loss. Results are summarized in Table 3.

Examples 10~12

Sheet foam and tray were prepared by carrying out the same procedures as described in Example 7 except that a copolymer of L-lactide and hydroxycarboxylic acid was used. The thickness and apparent density of the sheet foam and results of degradation test are illustrated in Table 4.

TABLE 3

| Example | 7 | 8 | 9 |
|---|---|---|---|
| L-PLA (wt %) | 80 | 50 | 20 |
| DL-PLA (wt %) | 20 | 50 | 80 |
| Sheet thickness (mm) | 1.1 | 2.5 | 2.6 |
| Density (g/cc) | 0.14 | 0.10 | 0.09 |
| Weight loss in soil | 8 | 11 | 14 |

TABLE 3-continued

| Example | 7 | 8 | 9 |
|---|---|---|---|
| (35° C., 20 days) (%) | | | |

TABLE 4

| Example | 10 | 11 | 12 |
|---|---|---|---|
| L-Lactide (wt %) | 50 | 50 | 50 |
| Comonomer | D-lactide | glycolide | ε-caprolactone |
| Average molecular weight | 100,000 | 100,000 | 70,000 |
| Sheet thickness (mm) | 2.5 | 2.8 | 2.3 |
| Density (g/cc) | 0.09 | 0.08 | 0.10 |
| Weight loss in soil (35° C., 20 days) (%) | 16 | 18 | 23 |

Examples 13~15

To a mixture of poly D,L-lactide having a molecular weight of about 100,000 and poly L-lactide as illustrated in Table 5, 0.5% by weight of talc was added as a cell regulator and melt-kneaded with a 50 mm φ extruder at 200° C. and successively butane was charged under pressure at a rate of 0.065 mole per 100 g of the resin. Thereafter the resin mixture was cooled by maintaining the cylinder temperature of the extruder at 140°~175° C. and delivered through a slit into the atmosphere to obtain a sheet foam having a thickness of 2~3 mm and a width of 650 mm. The cushioning property of the sheet foam obtained was evaluated by dropping a steel ball of ⅝ from a height of 46 cm to the sheet foam and measuring the rebound height in accordance with JIS K-6382. The apparent density and cushioning property are illustrated in Table 5.

The degradation test was conducted by burying the sheet foam at 35° C. into a soil having a moisture content of 30%. Results were evaluated by weight loss and are shown in Table 5.

TABLE 5

| Example | 13 | 14 | 15 |
|---|---|---|---|
| L-PLA (wt %) | 80 | 50 | 20 |
| DL-PLA (wt %) | 20 | 50 | 80 |
| Cushioning property (%) | 28 | 26 | 22 |
| Density (g/cc) | 0.14 | 0.10 | 0.09 |
| Weight loss in soil (35° C., 20 days) (%) | 8 | 11 | 14 |

Examples 16~18

Sheet foam was prepared by carrying out the same procedures as described in Example 13 except that copolymers of L-lactide and hydroxycarboxylic acid were used as illustrated in Table 6.

TABLE 6

| Example | 16 | 17 | 18 |
|---|---|---|---|
| L-Lactide (wt %) | 50 | 50 | 50 |
| Comonomer | D-lactide | glycolide | ε-caprolactone |
| Average molecular weight | 100.000 | 100.000 | 70.000 |
| Cushioning property (%) | 21 | 20 | 24 |
| Density (g/cc) | 0.09 | 0.08 | 0.10 |
| Weight loss in soil (35° C., 20 days) (%) | 16 | 18 | 23 |

What is claimed is:

1. A method for preparing a degradable foam having numerous cells dispersed throughout a polymer comprised of a polylactic acid or a copolymer of lactic acid and hydroxy carboxylic acid, said method comprising forming a mixture of said polymer and a decomposition foaming agent and decomposing said decomposition type foaming agent to form a melt composition having numerous cells and cooling said composition while maintaining said cells to form said degradable foam.

2. The method of claim 1 wherein said decomposing is by heating the mixture.

3. The method of claim 1 wherein said mixture is melt extruded to form said degradable foam.

4. The method of claim 1 wherein said decomposition type foaming agent is selected from the group consisting of sodium hydrogen carbonate, azodicarbonamide, N,N'-dinitrosopentamethylenetetramine, p,p'-oxybis(benzenesulfonylcarbazide), azobisisobutyronitrile, and benzenesulfonylhydrazide.

* * * * *